(No Model.)   12 Sheets—Sheet 5.
E. BAUDOUX & E. GOBBE.
FURNACE FOR GLASS WORKS.
No. 549,427. Patented Nov. 5, 1895.
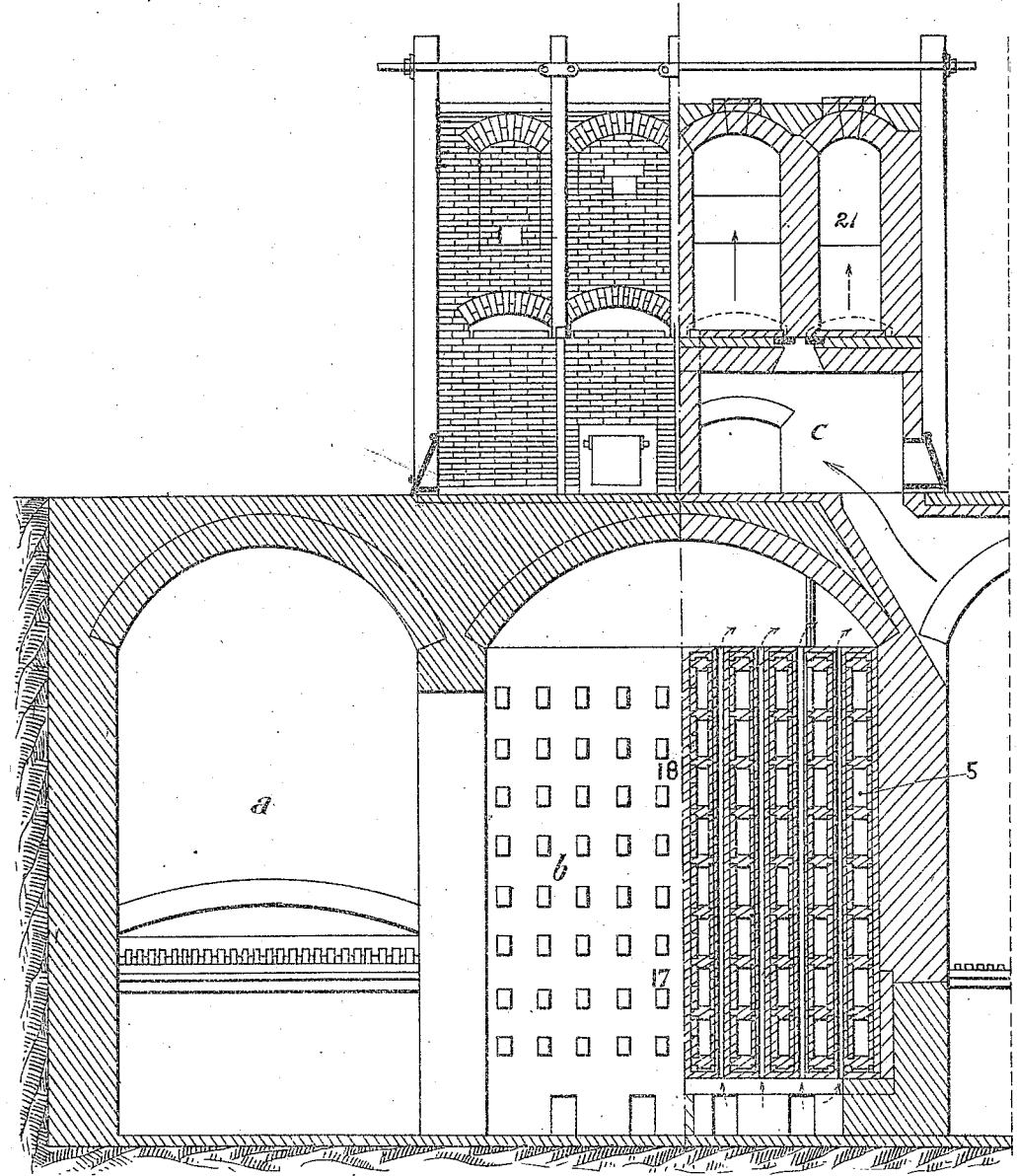

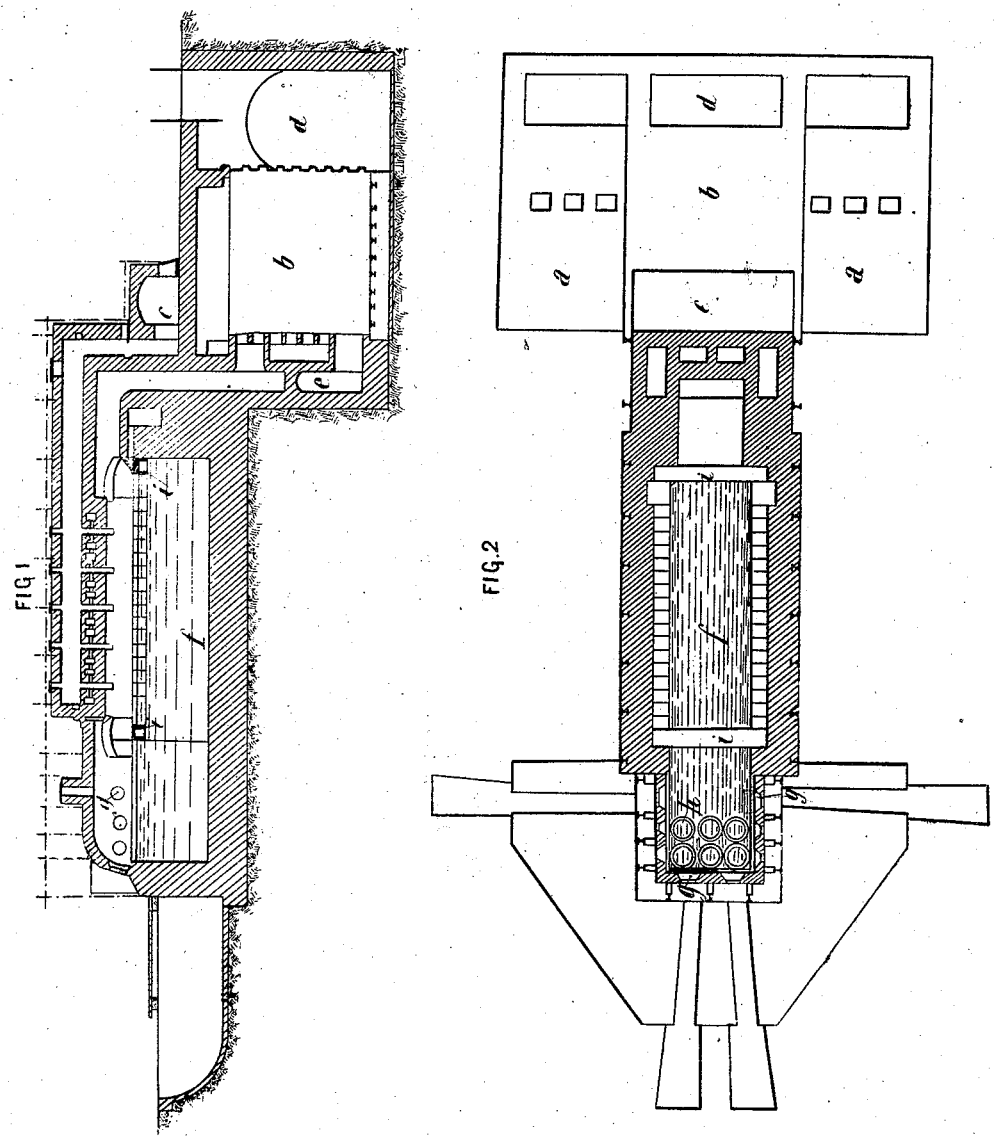

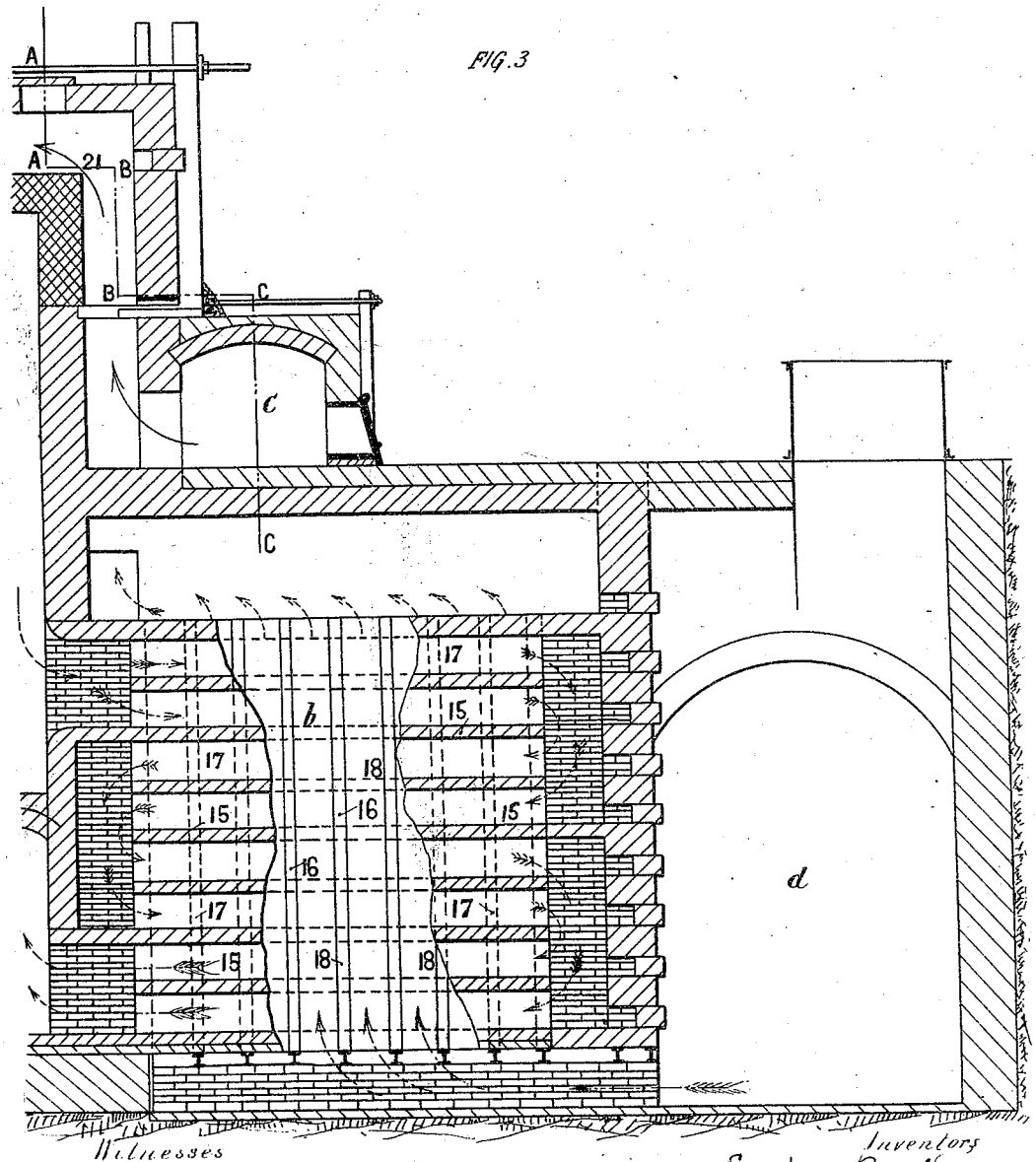

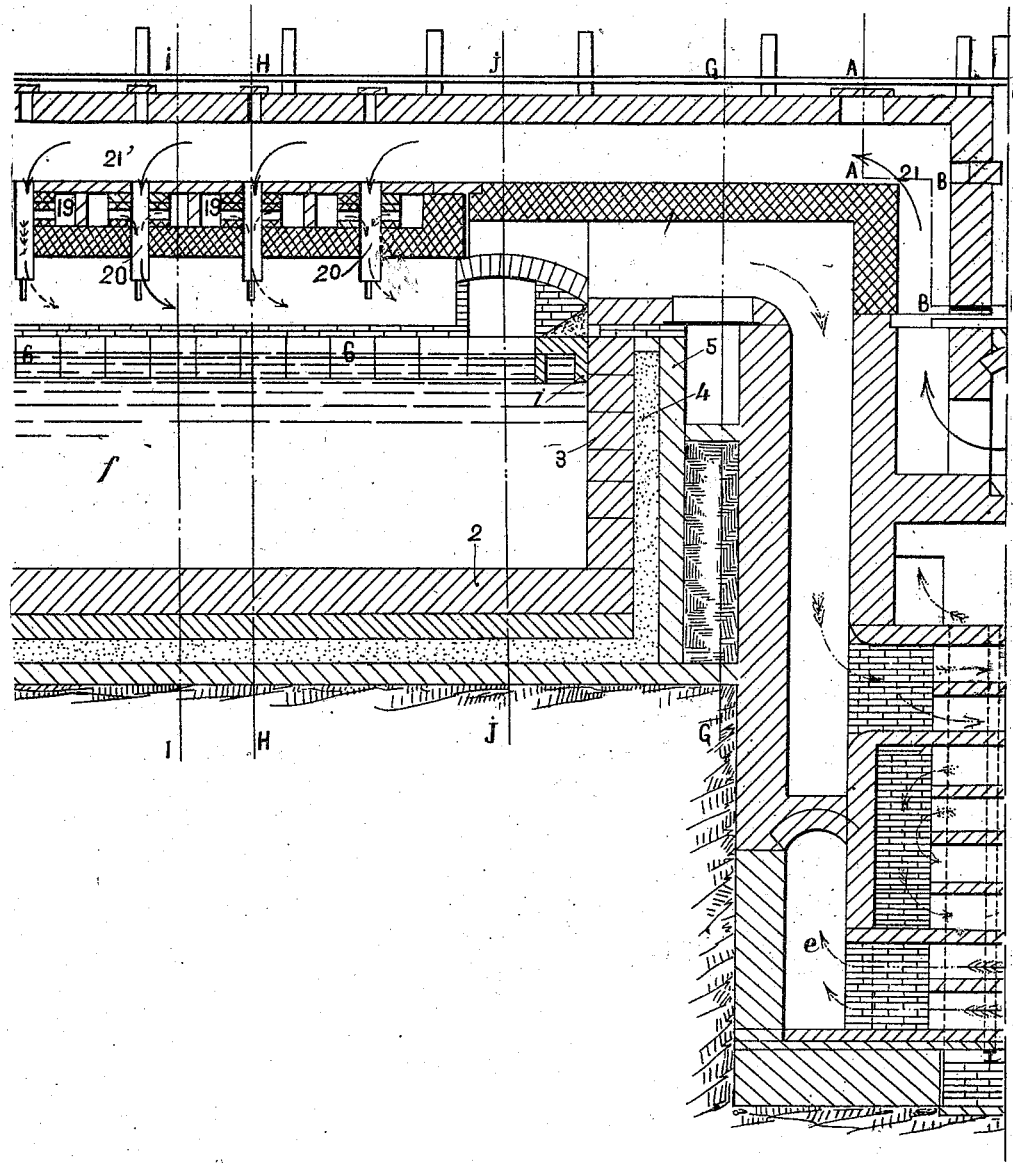

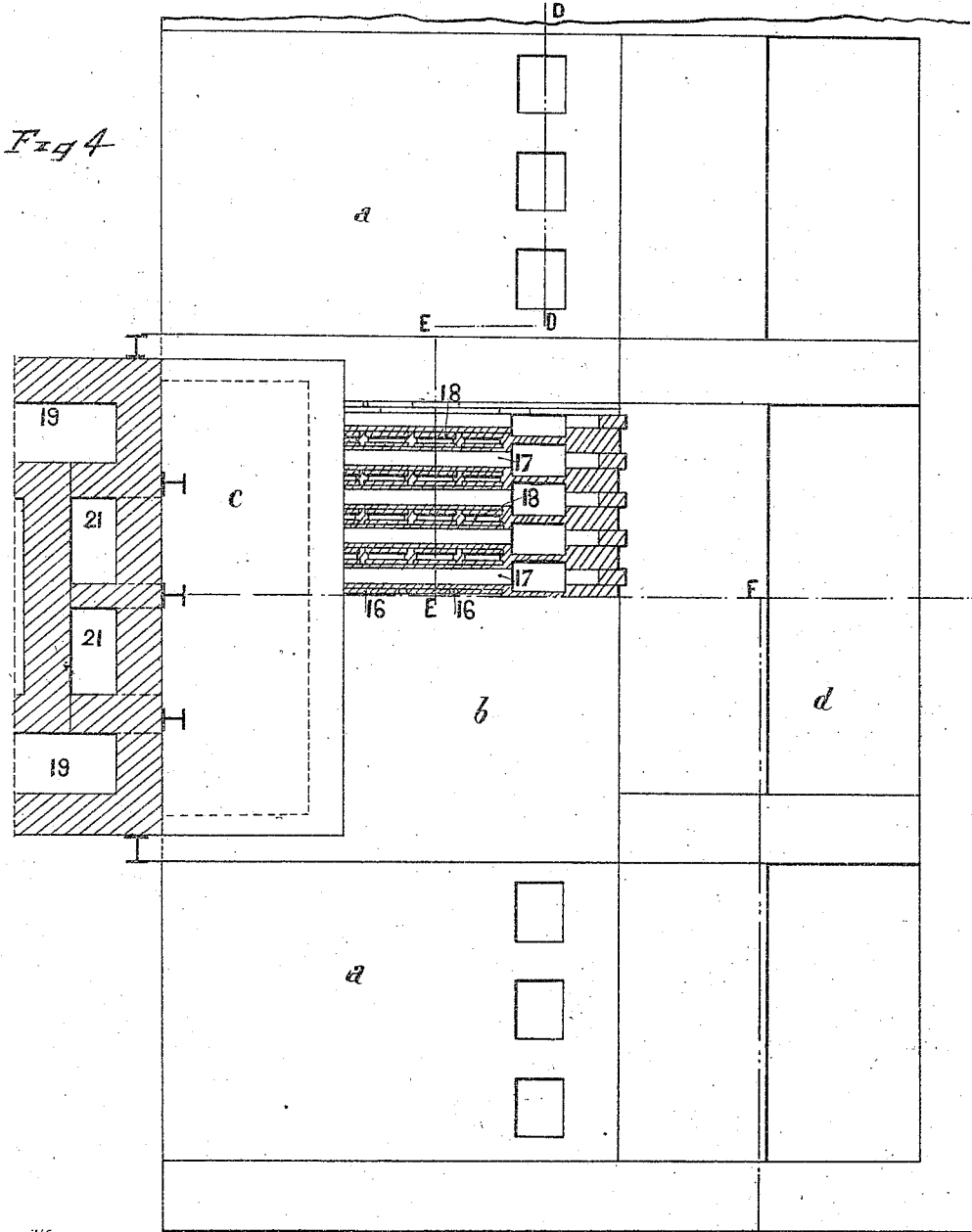

(No Model.) 12 Sheets—Sheet 6.
E. BAUDOUX & E. GOBBE.
FURNACE FOR GLASS WORKS.
No. 549,427. Patented Nov. 5, 1895.
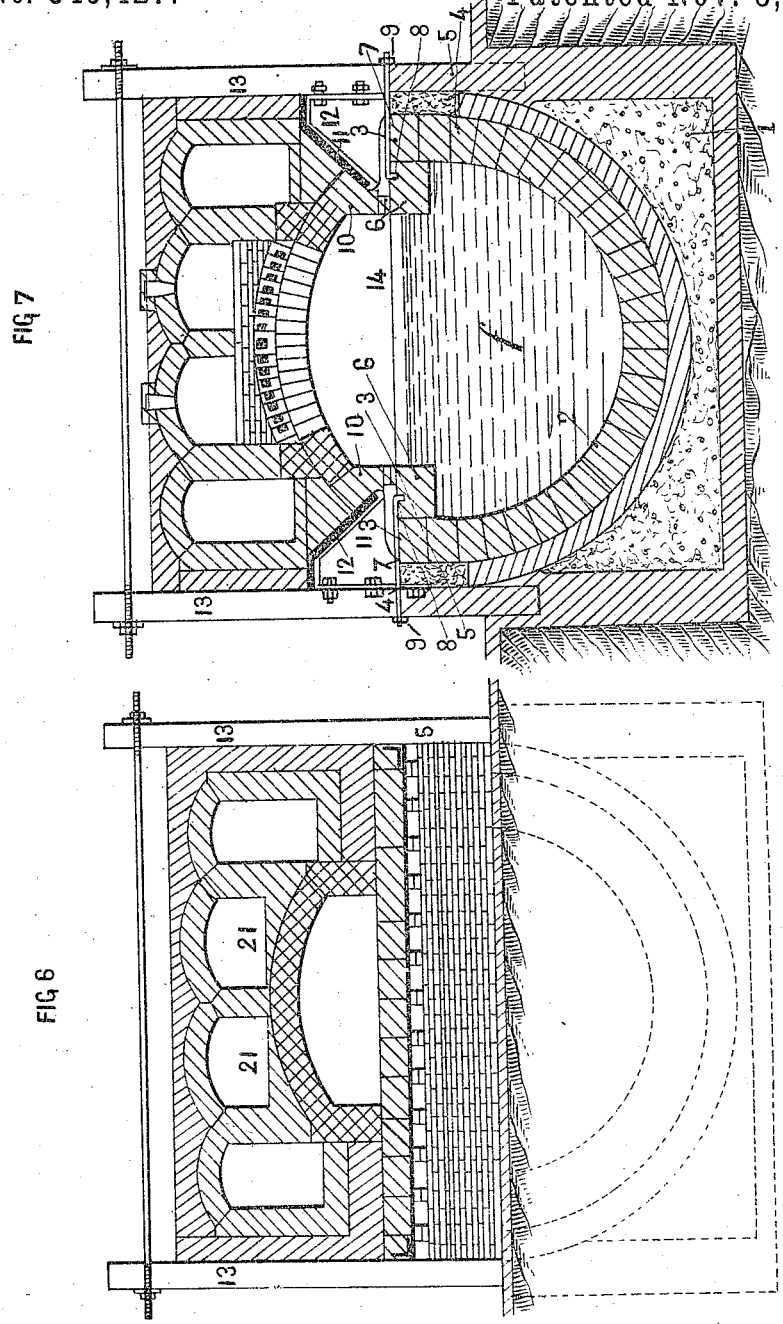
Witnesses
Inventors
Eugène Baudoux and
Emile Gobbe,
By James L. Norris
their Attorney (No Model.) 12 Sheets—Sheet 7.

E. BAUDOUX & E. GOBBE.
FURNACE FOR GLASS WORKS.

No. 549,427. Patented Nov. 5, 1895.

Witnesses

Inventors
Eugene Baudoux and
Emile Gobbe
By James L. Norris
their Attorney (No Model.) 12 Sheets—Sheet 8.
E. BAUDOUX & E. GOBBE.
FURNACE FOR GLASS WORKS.
No. 549,427. Patented Nov. 5, 1895.
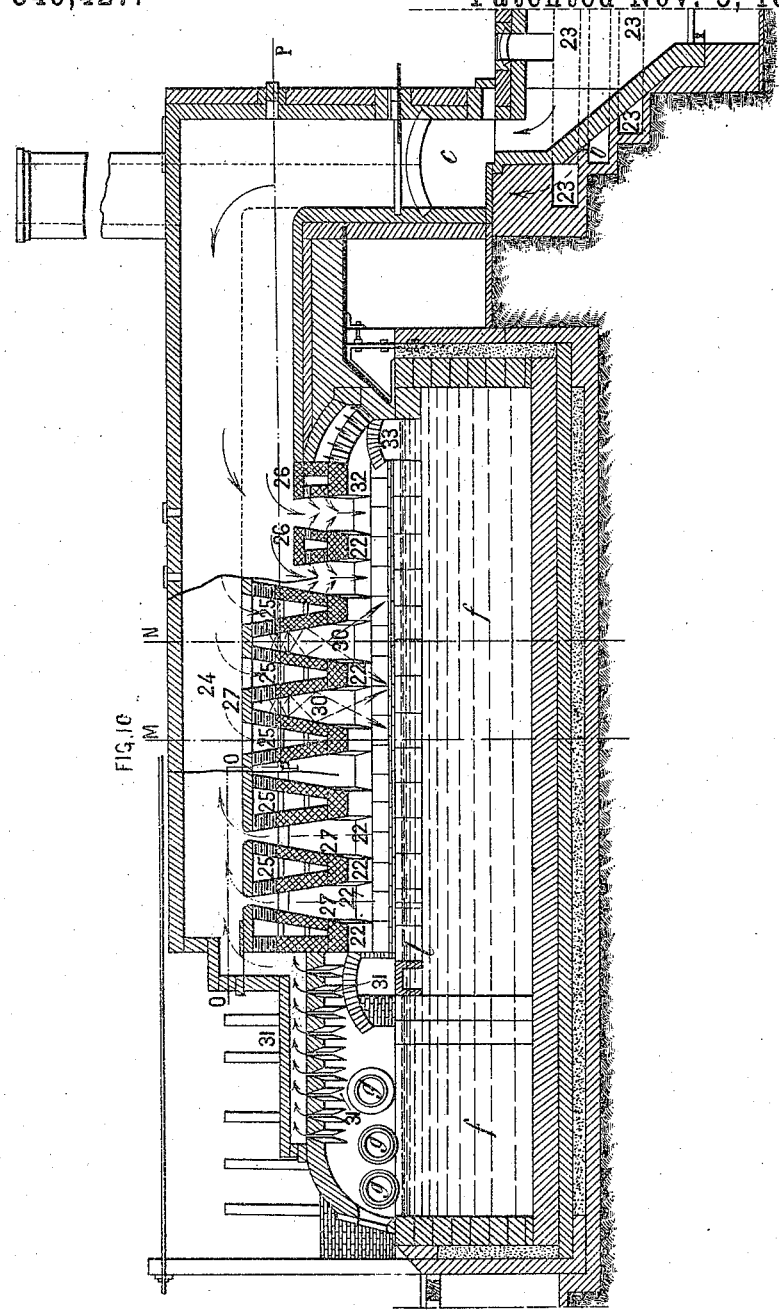
Witnesses
Inventors
Eugène Baudoux and
Emile Gobbe
By James L. Norris
their Attorney (No Model.)

E. BAUDOUX & E. GOBBE.
FURNACE FOR GLASS WORKS.

No. 549,427.  Patented Nov. 5, 1895.

12 Sheets—Sheet 9.

Witnesses
John Imrie
Robert Everett

Inventor
Eugène Baudoux and
Emile Gobbe
By James L. Norris
Their Attorney

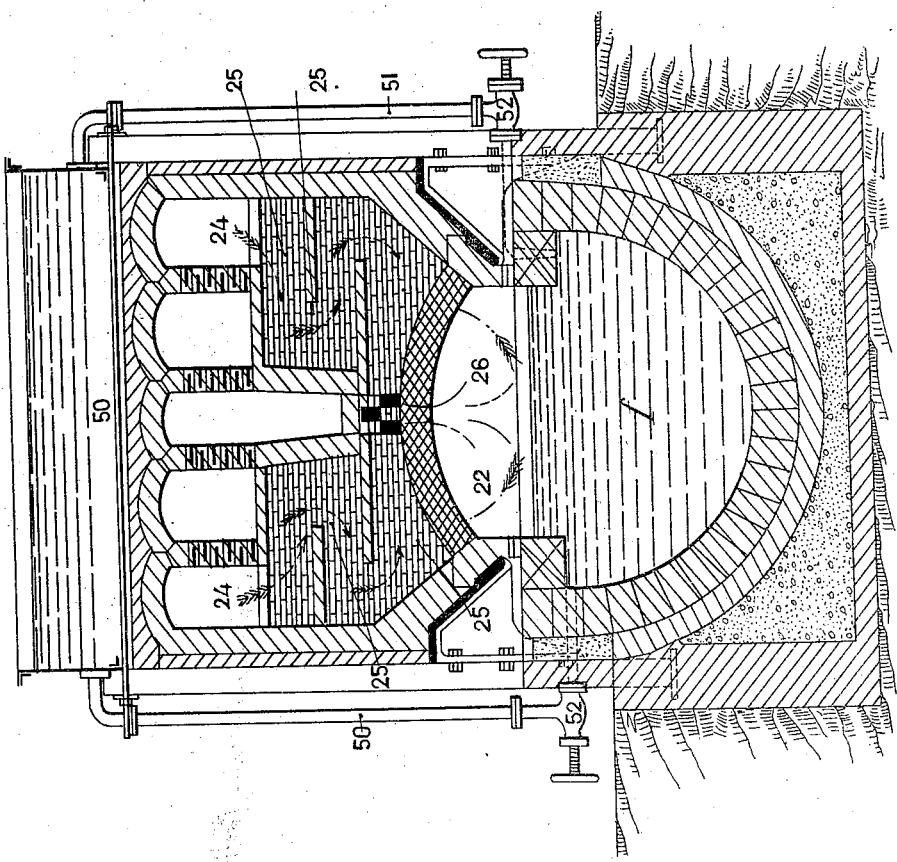
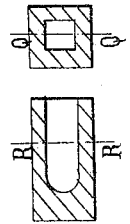

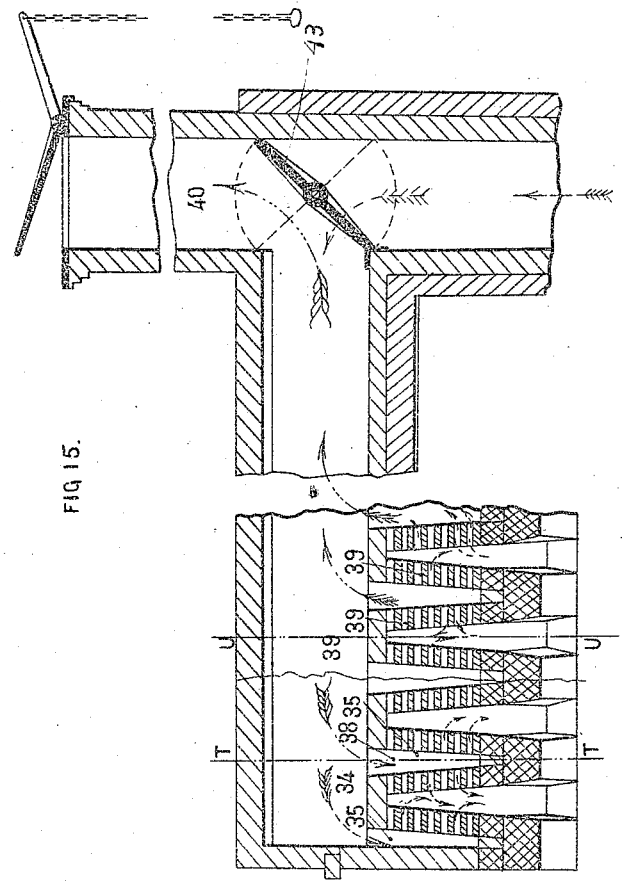

(No Model.)
E. BAUDOUX & E. GOBBE.
FURNACE FOR GLASS WORKS.
No. 549,427.
12 Sheets—Sheet 12.
Patented Nov. 5, 1895.
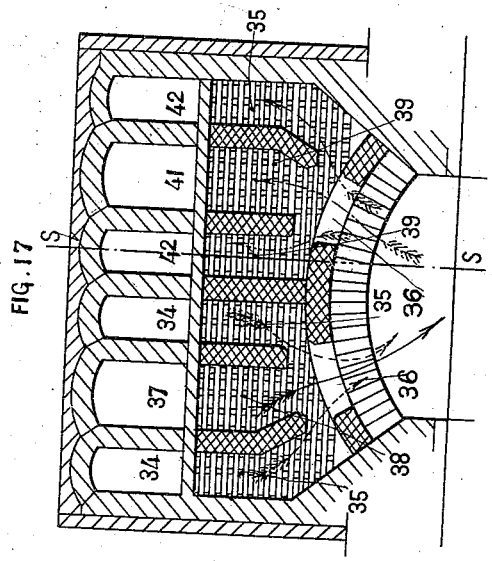
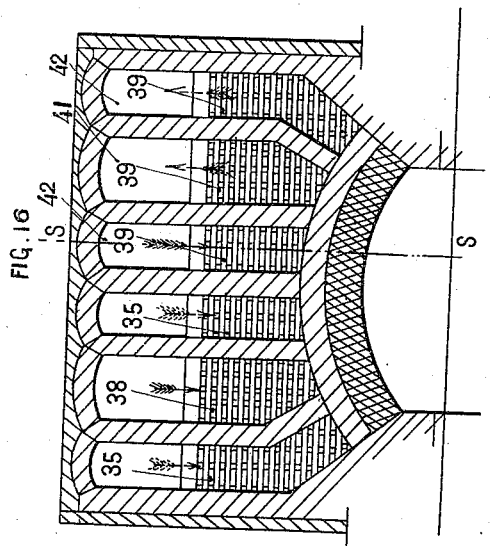

UNITED STATES PATENT OFFICE.

EUGÈNE BAUDOUX AND EMILE GOBBE, OF JUMET, BELGIUM.

FURNACE FOR GLASS-WORKS.

SPECIFICATION forming part of Letters Patent No. 549,427, dated November 5, 1895.

Application filed May 3, 1894. Serial No. 509,987. (No model.) Patented in Belgium August 17, 1891, No. 96,041.

*To all whom it may concern:*

Be it known that we, EUGÈNE BAUDOUX and EMILE GOBBE, citizens of Belgium, and residents of Jumet, Hainaut, Belgium, have invented a new and useful Improvement in Furnaces for Glass-Works, of which the following is a specification, and for which we have obtained Letters Patent of Belgium, No. 96,041, dated August 17, 1891.

The improvements forming the subject of the present application for a patent have for their objects to economize fuel, to reduce the expense of repairing the furnaces, and to enable a better quality of glass of a better color to be produced.

These improvements relate to the following features: first, the mode of constructing the basin of the tank, which has a vertical back and side walls; second, special arrangements for increasing the "life" of the blocks composing the tank, particularly at the level of the liquid glass; third, the method of suspending and constructing the arched roof of the tank; fourth, regenerating the heat by contact, conduction, and by radiation; fifth, special arrangements for agitating and refining the molten glass.

These various improvements are shown by way of illustration only in the accompanying drawings, in which—

Figure 9:
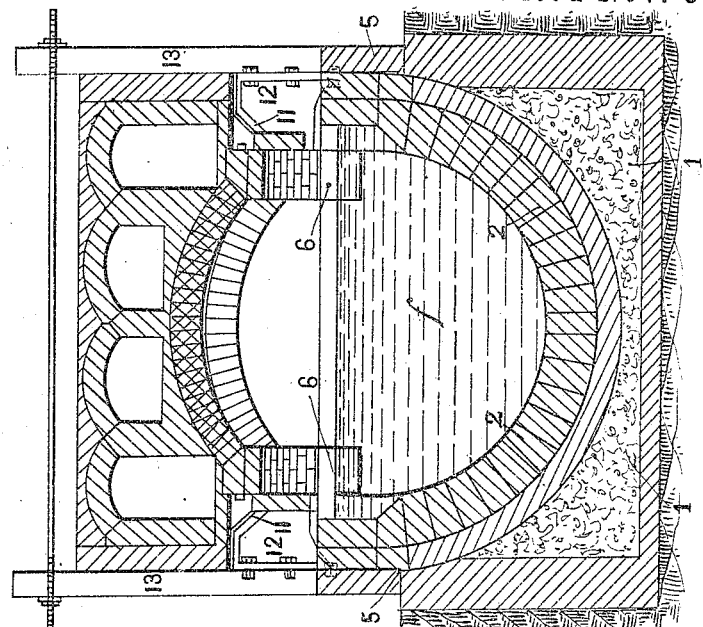
Figure 8:
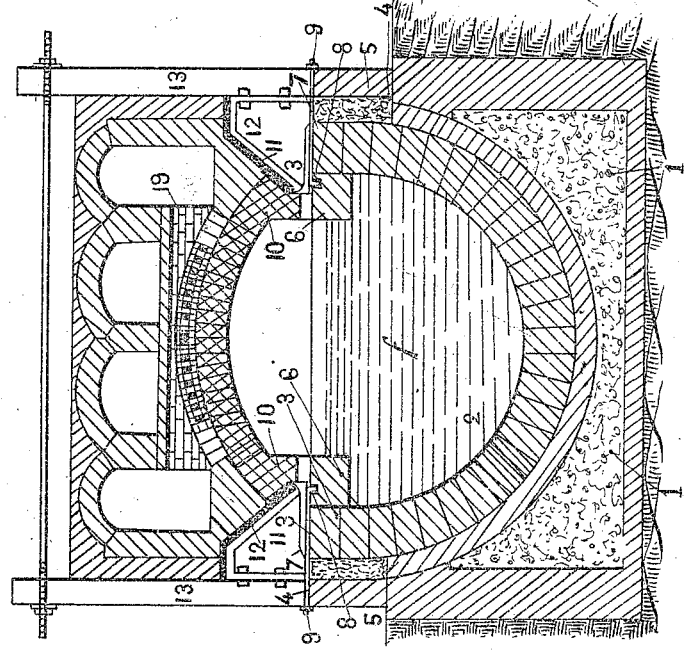
Figure 11:
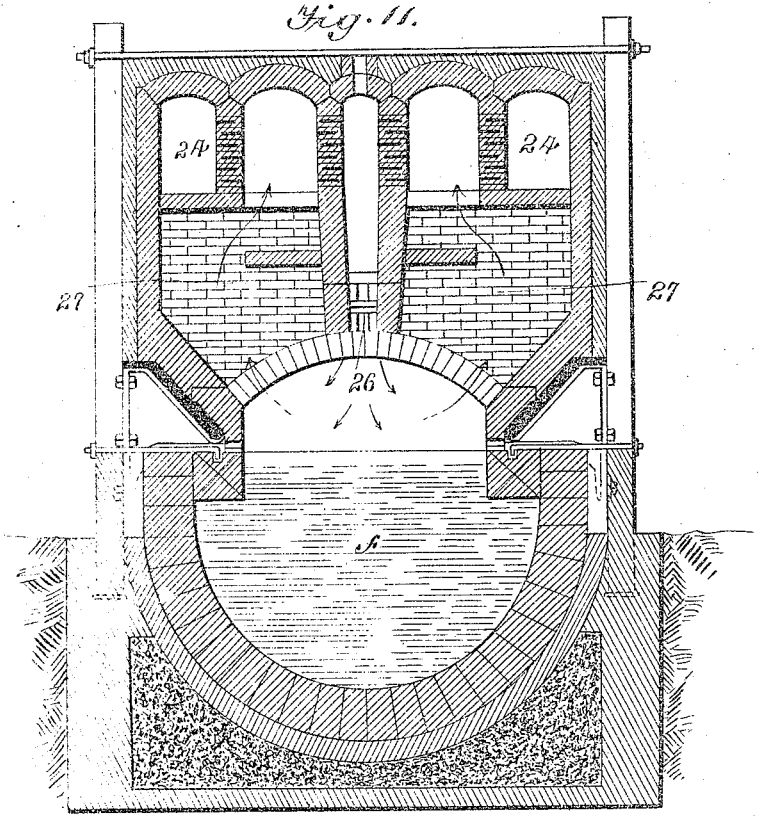
Figure 13:
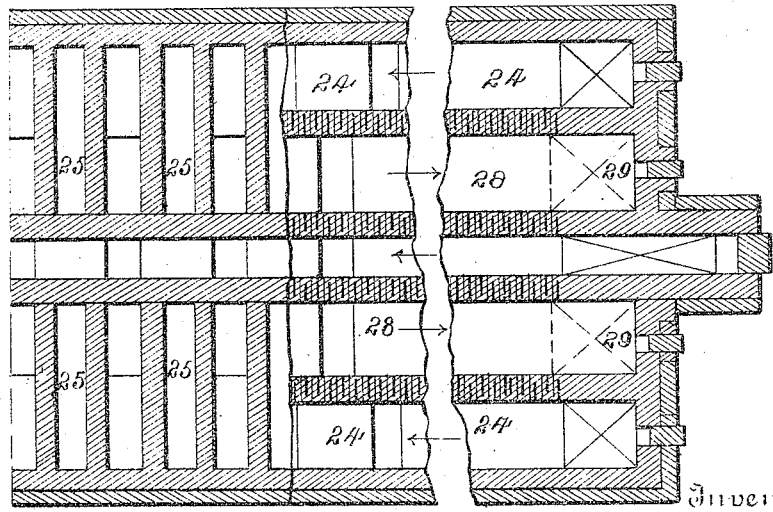

Figure 1 is a diagrammatic view showing the general arrangement of our improved tank-furnace in vertical longitudinal section. Fig. 2 is a diagrammatic view showing the same arrangement in horizontal section, taken through the working or withdrawing openings of the furnace. Figs. 3 and 3ᵃ are longitudinal sections, on a larger scale, of portions of the furnace and the regenerator, seen, respectively, at the center and on the right hand of Fig. 1. Fig. 4 shows on a larger scale the details of construction of the right-hand portion of Fig. 2; Fig. 5, a cross-section taken through the regenerator and the gas-generators on the broken lines A A B B C C of Fig. 3ᵇ and D D E E F F of Fig. 4ᵇ. Fig. 6 is a cross-section taken between the tank and the vertical columns on the line G G of Fig. 3ᵃ. Fig. 7 is a cross-section taken through one of the burners on the line H H of Fig. 3ᵃ. Fig. 8 is a cross-section taken between two burners on the line I I of Fig. 3ᵃ. Fig. 9 is a cross-section taken through the charging openings or passages for the floats on the line J J of Fig. 3ᵃ. Fig. 10 is a diagrammatic view showing in longitudinal section the general arrangement of a modified construction of our improved tank-furnace. Fig. 11 is a cross-section of the same furnace, taken between the burners. Fig. 12 is a cross-section taken through one of the burners. Fig. 13 is a horizontal section taken through the air, gas, and smoke flues. Fig. 14 shows, respectively, in longitudinal section on the line Q Q and in cross-section on the line R R a special hollow brick employed in the construction of the furnace. Fig. 15 shows in vertical longitudinal section on the line S S of Figs. 16 and 17 another modification of the construction of the regenerator. Fig. 16 is a cross-section of the same, taken between the burners, on the line T T of Fig. 15. Fig. 17 is a cross-section through one of the burners on the line U U of Fig. 15.

In the drawings, $a$ represents the gas generator or generators; $b$, the regenerator; $c$, the gas-collector; $d$, the generator-flue; $e$ is a flue leading to the chimney; $f$, the tank of the furnace; $g\ g$, the working or withdrawing openings; $h$, the working rings, and $i\ i$ the floating dams or barriers.

The arrows drawn so ———→ indicate the course of the cold air. The arrows drawn so ——————— indicate the course of the hot air. The full arrows ——→ indicate the path of the gas, and the arrows drawn so ——————→ indicate the path of the waste gases or smoke.

In order to obviate leakage of molten glass through the joints of the brickwork of the basin of the tanks, it is usual to ventilate the said brickwork as much as possible by constructing the bottom with an open space underneath and by leaving the vertical walls completely uncovered in order that they may become thoroughly cooled by the surrounding air. The consequence of this is a very great loss of heat, because this heat is taken from the glass in the tank—that is to say, is abstracted from the heat employed for melting and refining. Now in order to obviate this loss of heat we construct the bottom of the tank on a solid mass of brickwork or preferably on a bed of sand 1; but as the bricks forming the bottom would rise to the surface of the molten glass if said bottom were built horizontally, as in the ordinary way, we build it in the form of an inverted arch 2 or other shape that will exclude the possibility of the bricks composing said bottom becoming forced upward by displacement. Now as this bottom is no longer cooled on the outside the liquid glass will penetrate throughout the joints of the brickwork and will leak through beyond the same up to the point where it is far enough away from the fire to become solidified. Under these circumstances the bricks composing the bottom will seek to rise to the surface of the glass in the tank by reason of their smaller density and will only be kept in position by means of the shape of the inverted arch, which opposes this upward displacement.

With regard to the loss of heat through the vertical walls 3 we also prevent the same, to a large extent, by means of a layer of sand 4, placed against the said walls and kept in place by the outer walls 5. In this case displacement of the bricks of the tank in consequence of the pressure of the liquid glass need not be feared, because the external cold will solidify the glass before it can penetrate into the layer of sand, and, furthermore, the vertical weight borne by said bricks will be sufficient to resist their displacement in a horizontal direction. As the molten glass rapidly corrodes the bricks of the tanks, particularly at the level of the liquid mass, we arrange at level of the liquid mass along the walls floating blocks 6, which are kept in place by a bent piece of iron 7, having one end in a notch 8, formed in the block 6, and its other end screw-threaded, and with a nut 9 for enabling each block to be fixed to that part of the wall it is desired to protect. When the floating bricks 6 are worn out, they are replaced by others, which have first been heated, without even having to lower the level of the molten glass, in a very easy manner and in the same way as the floats and rings are replaced. These repairs can thus be made without loss of time or stopping the working, which is of great importance in every respect.

In order that the floating bricks 6 shall have a long "life," it is necessary that they should be as much as possible out of the direct action of the fire, and in order that they shall protect efficiently the vertical walls of the tank it is absolutely necessary that these walls should be outside of the arch—that is to say, also outside of the direct action of the fire. It is to effect this twofold object that the haunch or springing 10 of the arch is caused to jut out considerably over the molten glass. It is carried by cast-iron plates 11, resting on brackets 12, bolted to the retaining-irons 13 of the tank. The space 14 left between the haunch 10 and the floating bricks 6 is closed with small bricks or sand. By this means the flame cannot escape from the tank through this space, and thus damage the supports of the arch.

It is also with the object of obviating the loss of heat through the extrados of the arch of the tank that we have located all the gas, air, and smoke flues on the arch in such a manner as to envelop it as much as possible, contrarily to the ordinary mode of procedure.

This furnace may be heated by means of any of the apparatus already known, or the regenerator illustrated in Figs. 1, 2, 3$^b$, 4, and 5 may be employed for heating the air. This regenerator is composed of vertical partitions formed of double walls with crossed joints, so as to thoroughly divide the air from the fire-gases. These walls form with the horizontal and vertical cross-pieces 15 and 16 horizontal passages 17 for the escape of the fire-gases and vertical passages 18 for heating the air. After the air has become heated in these vertical passages it passes through the flues 19 and 19' to the burners 20, where it meets the gas supplied direct from the gas-generators to the furnace by the passages 21 and 21'. The arrows indicate the paths of the air, gas, and products of combustion. This regenerator has the special advantage of being very strong and tight.

Figs. 10 and 14 show another arrangement of apparatus, which is not expensive and which could be employed especially when good and very refractory materials are at one's disposal, because in this arrangement the bricks forming the arched roof are exposed to a great deal of wear and tear. This arched roof is composed of a series of arch piers 22, on which rest walls that are almost vertical and are slightly inclined toward one another. In order to impart a sufficient upward force to the air, it is heated slightly in a small regenerator of any kind, or in a small furnace, or, more simply, in flues 23, along the walls of the gas-generators, where it acquires a pressure sufficient for it to follow the horizontal passages 24 and then to pass down in the intermediate spaces 25, which are heated to a very high temperature by the waste fire-gases of the furnace. In order to increase the surface for heating the air, it is advisable to construct the walls separating the air from the fire-gases of the horizontal flues 24, as also the upper part of the walls of the intermediate spaces 25, of special hollow bricks open at one end only, Fig. 14, and placed alternately in one and the other sense. The air thus heated meets the gas through small holes 26, and the flame thus produced escapes from the furnace to the right and to the left of the burners through the intermediate spaces 27, whence it passes to the chimneys 29 through the conduits 28.

The walls between which the products of combustion escape are inclined to one another and are heated to a higher temperature than the glass in the tank, so that they radiate the heat directly onto the glass and even by reflected rays from the glowing surface of the bricks, which become heated to a high temperature. These rays will thus be reflected onto the glass in the tank in the opposite direction to that of the travel of the products of combustion, with the result of effecting a more complete regeneration and utilization of the heat, and consequently an appreciable saving in fuel. It is with the same object that we allow a portion of the products of combustion to escape through the inclined slots 31, even at those places of the arch where there are no burners. This mode of constructing the arched tops has also the effect of maintaining them at a higer temperature, because the bricks become heated on their under sides and also laterally in such a manner as to render the rays they reflect onto the glass in the tank not only more numerous, but also more intense.

In some cases, especially where it would be difficult to form inclined slots, it would be sufficient to form a great number of small holes in the arch or in all the parts directly facing the interior of the furnace in order to draw thither waste gases, which will serve to maintain the said brickwork at a more elevated temperature. We have proceeded in this manner with regard to the portion 32 of the arch, which is directly opposite the cold materials that are being charged in at the openings 33, because the arch is at this place greatly cooled by the proximity of the fresh charge and the holes with which it is pierced will maintain it at a higher temperature, and thus hasten the melting of the materials.

Figs. 15, 61, and 17 illustrate the mode of carrying out the same ideas by applying the principle of regeneration of the heat by reversing currents for heating the air and gas. The air will receive an upward impulse, as before described, or may be simply forced in by a blower, which imparts the requisite pressure to it without heating it, because it is of small importance whether it arrives cold in the passages 34, which convey it to the regenerators 35, so long as it is hot enough when it meets the gas at the burners 36. The gas itself comes directly from the gas-generators into the passages 37, and then it passes through the numerous small holes 38, where it becomes heated in the middle of the two jets of hot air of the burners 36. The products of combustion escape through the numerous apertures of the open-work walls 39 on their way to the chimneys 40 through the horizontal flues 41 and 42. The currents can be changed by merely operating the dampers 43 or any ordinary valves located near the top of the horizontal flues. This mode of construction also keeps the arch very hot, as in the preceding arrangement, and has the advantage of low first cost, because it reduces greatly the dimensions of the regenerator-chambers, and it enables a great part of the flues and also the draft-chimney of the usual plant, to be dispensed with. As the glass ordinarily made in tank-furnaces is usually wavy or streaked by reason of want of homogeneity, we obviate this defect by agitating the liquid mass by the following process: A reservoir 50, Fig. 11, is located at a certain height above the level of the glass and contains water or preferably a concentrated solution of an oxidizing salt, such as sulphate or nitrate of soda. From this reservoir we lead the liquid to a certain depth below the level of the glass by means of a metallic pipe 51, fitted with a cock 52, in such a manner that the water in passing into the molten glass becomes immediately converted into steam and agitates energetically the molten glass in the tank. Furthermore, if the water contains, for example, nitrate of soda in solution, then, after the water has become evaporated inside the glass in the tank, the nitrate will remain behind and will mingle intimately with the liquid glass, whereby the metallic oxides and the carbon which color the glass become peroxidized, so that the glass will be "washed," so to speak, by this operation—that is to say, it will become whiter. It is, however, not absolutely necessary in order to effect this last result that the metallic pipe should be immersed in the glass mass, because by merely bringing the liquid solution onto the surface of the glass mass the water by evaporation will cool the part with which it is in contact to a sufficient extent to cause the formation of a crust, which will sink into the liquid mass by reason of its greater density and will take down with it the unevaporated nitrate, which will thus become mixed with the liquid glass and then produce the same results, as before stated. Finally, in case where it is desired to merely agitate the molten glass steam may be caused to bubble up through the latter by means of a pipe connecting the tank with any kind of boiler.

We now claim as our exclusive property—

1. In a glass furnace, the combination with the tank, of floating bricks arranged on the sides of the tank at the level of the molten glass, said bricks being provided upon their upper sides with recesses, and rods anchored in the sides of the tank and having bent ends detachably engaging the recesses in the bricks and operating to hold the latter in place, substantially as described.

2. In a glass furnace, the combination with the tank, of floating bricks arranged on the sides of the tank at the level of the molten glass, an arched top extending beyond said floating bricks upon each side of the furnace, and a removable filling or packing arranged between the upper sides of the floating bricks and the lower edges of the arch, substantially as described.

3. In a melting furnace, the combination with a tank having an arched roof, of regenerative passages arranged over said roof and communicating with said tank by means of downwardly inclined slots which operate to reflect the heat toward the heating hearth, the walls separating the air from the fire gases, being formed of hollow bricks open at one end, the open ends of said bricks being alternately disposed upon the opposite sides of the walls, substantially as described.

4. The method herein described of treating molten glass in furnace tanks, consisting in injecting therein water containing an oxidizing salt in solution.

In testimony whereof we have signed this specification in the presence of two subscribing witnesses.

EUGÈNE BAUDOUX.
EMILE GOBBE.

Witnesses:
 JN. GOBBE,
 FR. RAUXHAUGH.